(12) United States Patent
Hales et al.

(10) Patent No.: US 12,047,411 B2
(45) Date of Patent: Jul. 23, 2024

(54) DETECTING COMPROMISED WEB PAGES IN A RUNTIME ENVIRONMENT

(71) Applicant: Shape Security, Inc., Santa Clara, CA (US)

(72) Inventors: Wesley Hales, Atlanta, GA (US); Jarrod Overson, Santa Clara, CA (US)

(73) Assignee: SHAPE SECURITY, INC., Seattle, WA (US)

(*) Notice: Subject to any disclaimer, the term of this patent is extended or adjusted under 35 U.S.C. 154(b) by 526 days.

(21) Appl. No.: 16/709,198

(22) Filed: Dec. 10, 2019

(65) Prior Publication Data

US 2021/0176273 A1 Jun. 10, 2021

(51) Int. Cl.
*H04L 9/40* (2022.01)
*G06F 16/958* (2019.01)

(52) U.S. Cl.
CPC ........ *H04L 63/1483* (2013.01); *G06F 16/986* (2019.01); *H04L 63/1416* (2013.01)

(58) Field of Classification Search
CPC ...... G06F 16/986; G06F 21/55; G06F 21/554; G06F 21/566; H04L 63/1416; H04L 63/1441; H04L 63/1475; H04L 63/1483
See application file for complete search history.

(56) References Cited

U.S. PATENT DOCUMENTS

| | | | | |
|---|---|---|---|---|
| 2004/0088570 A1* | 5/2004 | Roberts | ............... | H04L 63/1416 709/206 |
| 2005/0114658 A1* | 5/2005 | Dye | .................... | H04L 63/1408 707/999.009 |
| 2015/0341385 A1 | 11/2015 | Sivan et al. | | |
| 2016/0088015 A1 | 3/2016 | Sivan et al. | | |
| 2018/0219910 A1 | 8/2018 | Greenshpan et al. | | |
| 2019/0087574 A1* | 3/2019 | Schmidtler | ........... | G06F 21/563 |
| 2021/0232755 A1* | 7/2021 | Jadhav | .................. | G06F 16/986 |

OTHER PUBLICATIONS

Cor-Paul Bezemer, Ali Mesbah, and Arie van Deursen. 2009. Automated security testing of web widget interactions. In Proceedings of the 7th ACM SIGSOFT symposium on The foundations of software engineering (ESEC/FSE '09). Association for Computing Machinery, New York, NY, USA, 81-90. (Year: 2009).*
Phung, P. H et al., "Lightweight Self-Protecting JavaScript", Information, Computer, and Communications Security, ACM, New York, NY, Mar. 10-12, 2009, pp. 47-60.
EP Search Report for corresponding EP Application No. 20199360. 7, Feb. 26, 2021, pp. 1-9.

* cited by examiner

*Primary Examiner* — Theodore C Parsons
(74) *Attorney, Agent, or Firm* — Troutman Pepper Hamilton Sanders LLP (F5 PATENTS)

(57) ABSTRACT

Techniques are provided for detecting compromised web pages in a runtime environment. A first version of a web page is retrieved and loaded in a browser comprising a browser extension configured to detect event listeners added when web pages are loaded by the browser. First data is generated describing a first set of event listeners detected by the browser extension when the first version of the web page is loaded. At a second time a second version of the web page is retrieved and loaded in the browser. Second data is generated describing a second set of event listeners detected by the browser extension when the second version of the web page is loaded. It is determined that the web page is compromised based on comparing the first data and the second data. In response to determining that the web page is compromised, a threat response action is performed.

20 Claims, 6 Drawing Sheets

DETECTING COMPROMISED WEB PAGES IN A RUNTIME ENVIRONMENT

FIELD OF THE DISCLOSURE

The present disclosure generally relates to security techniques applicable to web server systems, and relates more specifically to detecting compromised web pages in a runtime environment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web servers can host web pages and serve the web pages to users in response to requests. Often, web servers provide web pages with web code that executes at client computing devices. Attackers may gain access to sensitive information by causing malicious code to execute at the client computing devices. For example, an attacker can insert malicious code into a hosted web page at a web server, causing the web serve to serve compromised web pages. The malicious web code may be provided to users along with legitimate content corresponding to the web page, including legitimate web code.

A user may visit a trusted web site and download the malicious web code if a web page at the trusted web site is compromised. Such malicious code may gather data in one or more objects defined in the web page, load and run additional malicious web code, and/or transmit data gathered at the user's computing device. For example, when the user enters authentication information and/or credit card information to submit to a trusted web site, the malicious web code may gather and forward the information to a server under control of the attacker, enabling the attacker to use the information for illicit gain. Such activity may occur without being detectable by a typical user. In some instances, the activity is triggered by an actions detected by the malicious web code when the user interacts with the web page in a browser, such as entering or submitting financial information in a web form.

Furthermore, when a web page is loaded at a browser, the browser may also load other resources as indicated by the web page. Such resources may include third-party web code for advertising, trackers, social media, or other widgets that can be embedded in web pages. Third-party web code can also load libraries at the client computing devices. The resources, third-party web code, and associated libraries may also be compromised by attackers, causing malicious web code to execute at the user's computing device. Web server administrators may wish to protect their users from such malicious attacks.

SUMMARY

The appended claims may serve as a summary of the invention.

Figure 1:
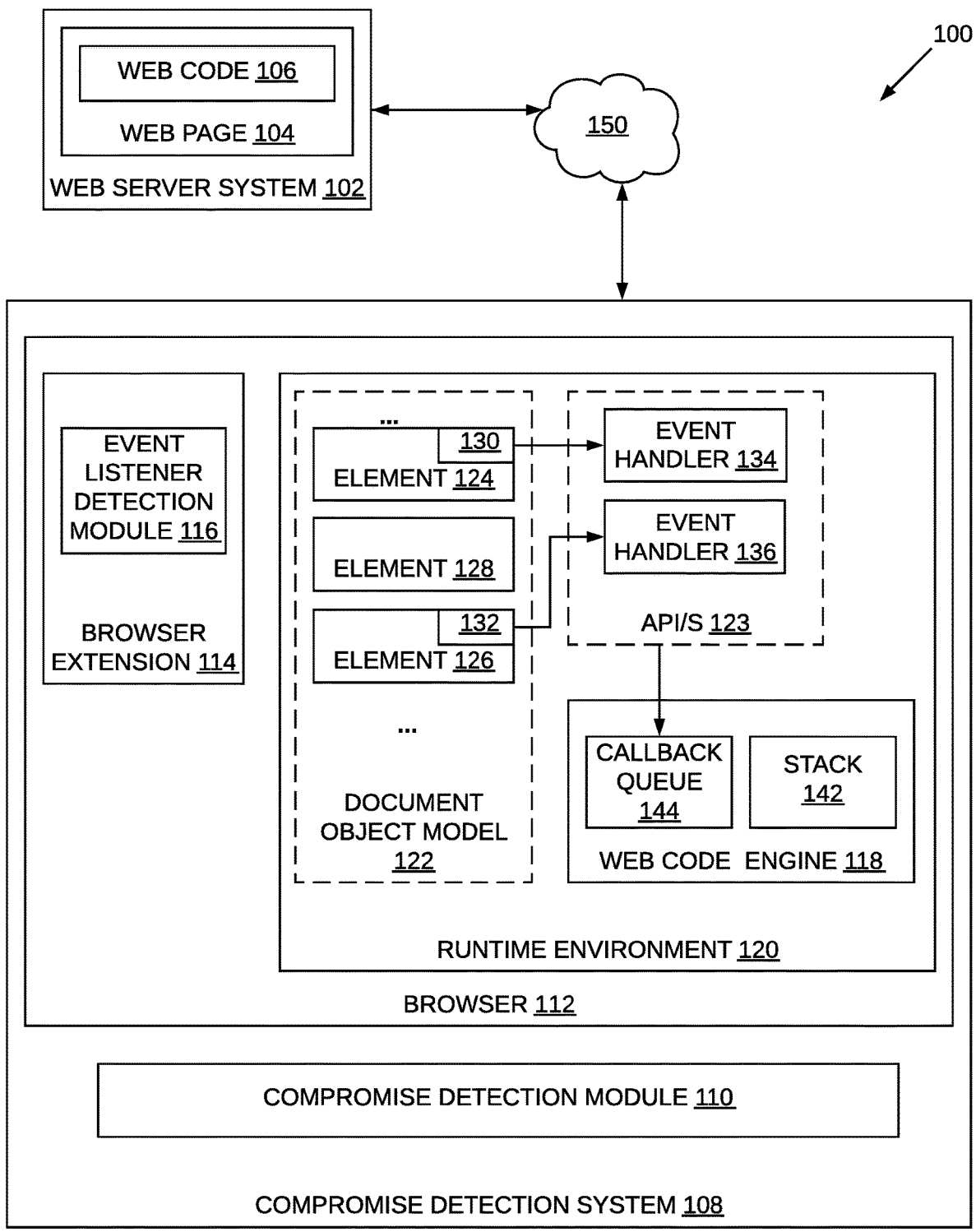
FIG. 1 illustrates a computer system that includes a compromise detection system in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

A "module" may be software and/or hardware stored in, or coupled to, a memory and/or one or more processors on one or more computers. Additionally or alternatively, a module may comprise specialized circuitry. For example, a module, such as the compromise detection module 110 or the event listener detection module 116, in FIG. 1 and discussed further herein, may be hardwired or persistently programmed to support a set of instructions to, and/or that are useful to, perform the functions discussed herein.

A "client" refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers (also referred to as "client computing devices").

A "server" refers to a combination of integrated software components and an allocation of computational resources, such as memory, a computing device, and processes on the computing device for executing the integrated software components. The combination of the software and computational resources are dedicated to providing a particular type of function on behalf of clients of the server. A server may refer to either the combination of components on one or more computing devices, or the one or more computing devices (also referred to as "server system"). A server system may include multiple servers; that is, a server system may include a first computing device and a second computing device, which may provide the same or different functionality to the same or different set of clients.

A "system" (such as but not limited to web server system 102, compromise detection system 108, web server systems 202-203, security server system 218, and compromise detection system 208) may include one or more computers, such as physical computers, virtual computers, or computing devices. For example, a system may be, or may comprise, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. A system may include another system, and computers may belong to two or more systems.

General Overview

This document generally describes systems, methods, devices, and other techniques for detecting compromised web pages in a runtime environment. A browser is provided extended functionality, such as in the form of a browser extension. The browser extension detects event listeners added in a runtime environment of the browser when an initial version of the web page is loaded in a browser of a system, such as a compromise detection system.

When a web page is loaded in a browser at runtime, some web code instructions are immediately executed upon loading the web page, while other web code instructions are executed only when an event occurs. For example, immediately-executed instructions may create an event listener that detects the occurrence of the event and, in response, causes the event-driven instructions to execute. Event listeners may detect user interactions with a web page in a browser, such as after a user enters and/or submits financial data, authentication credentials, or other sensitive information.

In some embodiments, a compromise detection system detects changes in event listeners when different versions of a web page are loaded in a browser. At a first time, the compromise detection system generates baseline data that describes event listeners detected by the browser extension when an initial version of the web page is initially retrieved and loaded in the browser. The web page may be considered clean, or free from malicious code, when the baseline data is obtained. At a subsequent time, the compromise detection system generates second data that describes event listeners detected by the browser extension when a second version of the web page is retrieved and loaded in the browser. By comparing the first data and the second data, the compromise detection system can detect changes to the event listeners added during runtime when loading the second version of the web page.

Based on the comparison, the compromise detection system can determine that the web page has been compromised. For example, the web page may be compromised at the web server, such as by the addition of malicious web code to the web page. The web page may also be compromised due to loading one or more resources that are compromised, such as third-party web code, resources that are embedded in the web page, and/or libraries loaded with such resource/s in the browser.

In some implementations, the various techniques described herein may achieve one or more of the following advantages: an owner of a web server system may better protect its users and itself from fraudsters; the protection may be provided relatively simply for the web server system in certain implementations, such as by using a security service that monitors hosted web pages using the techniques described herein to detect a compromised web page; the security service can be provided flexibly by an organization that specializes in web security, which can in turn keep the functionality updated to address ever-changing security threats; such a security organization can also aggregate data received from multiple web server systems across many clients that operate many domains, and can use that aggregated information to generate countermeasures that are more effective than countermeasures that could be developed using only data from a single domain. Additional features and advantages are apparent from the specification and the drawings.

System Overview

FIG. 1 illustrates a computer system that includes a compromise detection system in an example embodiment. The computer system 100 includes a web server system 102 and a compromise detection system 108. The web server system 102 serves a web page 104 over a network 150, such as the Internet. The compromise detection system 108 communicates with the web server system 102 over a network that includes the Internet 150 and/or one or more other networks.

The compromise detection system 108 may function as a client of the web server system 102 by requesting the web page 104 from the web server system 102 over the Internet 150. The compromise detection system 108 includes a browser 112 with a browser extension 114 that detects event listeners added when web pages such as web page 104 are loaded by the browser. The browser extension 114 is described in greater detail hereinafter.

Runtime Environment

The web browser 112 retrieves and loads the web page 104, such as by requesting the web page 104 from the web server system 102. The web page 104 may include one or more sets of instructions or data, such as but not limited to HTML, CSS, and/or JavaScript. Such instructions and data describe web page 104 presentation and define operations for the browser 112 to perform when the web page 104 is loaded in the browser 112.

As used herein, the term "web code" refers to instructions in a programming language that are executed in a web code engine 118 provided in a browser 112, where the web code engine 118 interprets and executes the web code 106 of a web page 104. The web code 106 may also refer to additional web code, such as third-party web code that can be embedded in web pages. The additional web code may be obtained by the browser 112 at runtime and processed as part of the web code 106. Thus, the term "web code" may include such additional web code referred to in web code hosted by the web server 102.

For example, one or more embodiments described herein may involve JavaScript web code 106 that is interpreted and executed by a JavaScript Engine in a JavaScript runtime environment embedded in the browser 112. As used herein, the term "runtime" refers to a time during which a program is running, such as when the browser 112 loads a web page 104 and when a user is able to interact with the web page 104. One or more embodiments are described herein with respect to JavaScript web code 106 that is processed by a JavaScript web code engine 118 in a JavaScript runtime environment 120 without limiting the techniques thereto.

When the web page 104 is loaded in the browser 112, a Document Object Model (DOM) 122 is created that represents the web page 104 as a tree structure of tags, also referred to herein as a "DOM tree". The DOM 112 may serve as an interface between the web code 106 and the web page 104 as presented in the browser 112. For example, JavaScript web code 106 may use elements 124-128 of the DOM 122 to implement event-driven functionality, as described in greater detail hereinafter.

Event-Driven Instructions

When a web page 104 is loaded in the browser 112 at runtime, the web code engine 118 processes the corresponding web code 106. Generally, the web code 106 includes immediately-executable instructions, such as function calls, that are pushed to the stack 142 as the web code 106 is processed by the web code engine 118. Items on the stack 142 are immediately processed until the stack 142 is empty.

The web code engine 118 may also be configured to process event-driven instructions. Event-driven instructions may be supported by one or more Application Program Interfaces (APIs) 123 or other libraries made available in the runtime environment 120 of the browser 112. For example, immediately-executed instructions in the web code 106 may create an event listener that detects the occurrence of a particular event. When the particular event occurs, specified event-driven instructions are executed in the runtime environment 120. As used herein, the term event handler refers to event-driven instructions that are performed in response to a specified event. For example, an event handler may be a user-defined JavaScript function that will execute in the runtime environment 120 when the event occurs.

In some embodiments, the web code 106 includes immediately-executed instructions that add one or more event listeners 130-132 to one or more elements 124-126 of the DOM 122 corresponding to the web page 104, and register the corresponding event handlers 134-136 in the runtime environment 120. If an event listener 130-132 is added to a particular element 124-126 of the DOM 122, then when the specified event is triggered with respect to the element 124-126, the corresponding event handler 134-136 is called. For example, the corresponding event handler 134-136 may be placed in a callback queue 144 of the web code engine 118. Instructions in the callback queue 144 are executed when the stack 142 is empty. Examples of events that can be triggered in the browser 112 include, but are not limited to: mouse events, touch events, keyboard events, focus events, change events, submit events, and other events that may be triggered in a browser.

As an example, an "on-click" event listener 130 may be added to a "Submit" button element 124. When a user clicks the "Submit" button corresponding to the element 124, the event listener 130 is triggered, causing the corresponding event handler 134 to be executed. As a further example, the corresponding event handler 134 may create XMLHttpRequest (XHR request) object. An XHR object includes methods that allow data transfer between a browser 112 and a web server, allowing for modifications to a loaded web page 104 during runtime without a full page request that may disrupt a user's interactions with the web page 104. An XHR object may be used to post, or transmit, sensitive data to a server that is accessible to an attacker. When used in an event handler 134, the XHR object may post sensitive data that is entered by a user during runtime after the immediately-executed instructions are processed, and after the user interacts with the web page 104 using the browser 112, such as by entering credentials and/or financial data.

Browser Extension

The browser 112 includes a browser extension 114 configured to detect event listeners added when web pages such as web page 104 are loaded by the browser 112. The browser extension 114 includes software that, when executed, extends the functionality of the browser 112. In some embodiments, the browser extension 114 includes an event listener detection module 116 that detects events listeners 130-132 that were added to elements 124-126 of the DOM 122 when the web page 104 is loaded by the browser 112. For example, the browser extension 114 may detect the event listeners 130-132 by traversing the DOM 122 tree for the web page 104.

In some embodiments, the browser is a standard instance of a commercially available browser that is instrumented with the browser extension 114. The commercially available browser may be a browser that provides developers a getListener( ) method or another method that exposes any event listeners 130-132 added to the elements 124-128 of the DOM 122. Alternatively and/or in addition, the browser extension may scan the web code 106 for instructions that add event listeners 130-132 to elements 124-126 of the DOM 122.

In some embodiments, the browser extension 114 is the only browser extension, plugin, or other modification to the browser 112 at the compromise detection system 108. Such modifications may cause additional resources to be loaded to the browser 112. In this case, the event listeners 130-132 detected by the browser extension 114 will not be affected by resources that may be loaded in a browser in an environment that is not similarly restricted. When such external modifications cause resources to be loaded that create new event listeners, these new event listeners are not created due to the web page 104 being compromised. Alternatively, the clean version of the web page 104 may be loaded in a browser 112 with a pre-selected set of plug-ins, browser extensions, and/or other modifications that have been cleared as free from known vulnerabilities.

Compromise Detection Module

In some embodiments, the compromise detection system 108 has a compromise detection module 110 performs one or more functions described herein. A web page 104 is compromised if loading a version of the web page 104 retrieved from the web server system 102 causes malicious web code to be loaded in the runtime environment 120 of the browser 112. For example, the malicious web code may add a malicious event listener that creates an XMLHttpRequest (XHR) object that posts data to a server that is accessible to an attacker.

In some embodiments, the compromise detection module 110 causes the browser 112 to retrieve and load a first version of the web page 104 at a first time, and the browser extension 114 and/or the compromise detection module generates first data that describes a first set of event listeners detected by the browser extension 114 when the first version of the web page 104 is loaded. The compromise detection module 110 also causes the browser 112 to retrieve and load a second version of the web page 104 at a second time, and the browser extension 114 and/or the compromise detection module generates second data that describes a second set of event listeners detected by the browser extension 114 when the second version of the web page 104 is loaded.

The compromise detection module 110 compares the first data and the second data. By comparing the first data and the second data, the compromise detection system 108 can detect changes in the event listeners added in the runtime environment 120 between the first time and the second time.

In some embodiments, the first data is baseline data that is generated when the browser 112 loads a clean version of a web page 104, and the first data is generated in a clean environment where. the browser 112 does not have browser extensions, plug-ins, or other browser modifications installed other than browser extension 114. When the baseline data is compared to the second data, new event listeners added in the runtime environment 120 can be detected. Because the first data is generated in a clean environment, the source of the additional event listeners detected in the runtime environment 120 must be the second version of the web page 104. That is, when the second version of the web page 104 is loaded in the browser 112, some web code created the event listener and event handler. Such web code is either present in the second version of the web page 104 or obtained due to web code in the second version of the web page. For this reason, it may be determined that the web page 104, as hosted at the web server system 102 at the second time, is compromised.

In some embodiments, the compromise detection module 110 periodically retrieves and loads subsequent versions of the web page 104, generating subsequent data describing event listeners detected by the browser extension 114 when the subsequent versions of the web page 104 are loaded. The compromise detection module 110 compares the subsequent data for each subsequent version of the web page 104 to the baseline data describing a set of event listeners detected by the browser extension when a clean version of the web page 104 is loaded.

The compromise detection module 110 may monitor the web page 104 by performing the comparison periodically, such as on a regular interval, in association with a recurring event, or on any other repeated basis. For example, the compromise detection module 110 may determine that the web page 104 is not compromised at a first subsequent time and that the web page 104 is compromised at a second subsequent time that is after the first subsequent time. The compromise detection module 110 may then determine that the web page 104 was compromised between the first subsequent time and the second subsequent time.

The compromise detection module 110 may update the baseline data for the web page 104. For example, the compromise detection module 110 may receiving an indication from the web server system that 102 the web page has changed at the web server system 102. In response, the compromise detection module 110 may cause the browser 112 to retrieve and load an updated version of the web page 104 and generate updated data describing an updated set of event listeners.

Threat Response Action

In some embodiments, when the compromise detection module 110 determines that the web page 104 is compromised, the compromise detection module 110 performs a threat response action. For example, the threat response action may include notifying the web server system 102 that the web page 104 is compromised. The web server system 102 may perform additional response actions based on the notification from the compromise detection module 110.

In some embodiments, the threat response action may include preventing a client computing device that requests the web page 104 from receiving the web page 104 from the web server system 102. For example, compromise detection module 110 may block or instruct another server system to block requests for the web page 104 directed to the web server system 102 and/or responses comprising the web page 104 sent from the client server system 102.

Security Server System

Figure 2:
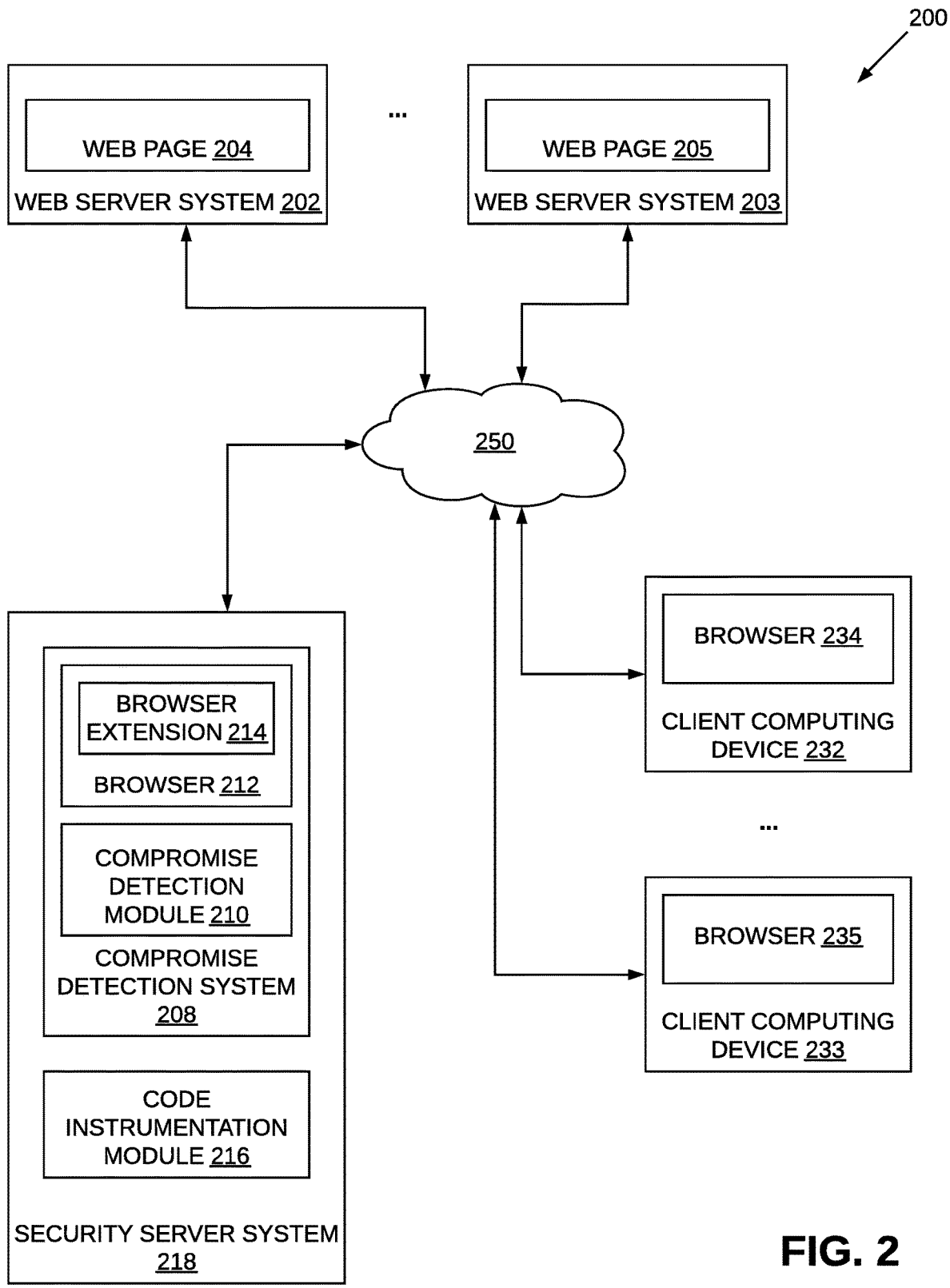
FIG. 2 illustrates a computer system that includes a security server system in an example embodiment.

FIG. 2 illustrates a computer system that includes a security server system in an example embodiment. System 200 includes one or more web server systems 202-203, a plurality of client computing devices 232-233, and a security server system 218.

The web server system/s 202-203 deliver one or more web page/s 204-205 over a network 250, such as the Internet. The web server system/s 202-203 provide the web page/s 204-205 in response to requests for the web page/s 204-205 from client computing devices, such as client computing devices 232-233. For example, the requests may include requests generated by the browsers 234-235 operating on the client computing devices 232-233 when users of the client computing devices 232-233 control the browsers 234-235. The users of the client computing devices 232-233 may include human users and/or automated software, which may include legitimate software and/or malicious software.

The security server system 218 provides security services for the web server system/s 202-203. The security server system 218 includes a compromise detection system 208 that detects compromised web pages in a runtime environment. The compromise detection system 208 is configured to monitor web page/s 204-205 hosted by the web server system/s 202-203 to when a monitored web page becomes compromised.

The security server system 218 may be operated by a security company on behalf of customers that operate the web server system/s 202-203. In some embodiments, the security server system 218 may also perform other security services. For example, the security server system 218 may include additional systems that provide an array of security monitoring and/or security countermeasures to protect web server systems from cybersecurity attacks. For example, the security server system 218 may include one or more systems that detect, prevent, or mitigate attacks performed using malicious automated software, including automated software that act as clients of the web server system/s 202-203. Such systems may operate on the same computing device/s and/or different computing device/s of the security server system 218 as the compromise detection system 208.

The web server system/s 202-203 may provide the web pages 204-205 in response to one or more requests generated by the browser 212 operating in the security server system 218. For example, the security server system 218 may include a compromise detection system 208 with a compromise detection module 210 that controls a browser 212 that has a browser extension 214. The browser extension 214 is configured to detect event listeners added when web pages such as web page/s 204-205 are loaded by the browser 112. In some embodiments, the security server system 218 may use data generated by the compromise detection system 208 to implement additional security countermeasure/s, as described in greater detail hereinafter.

XHR Whitelist

In some embodiments, an XHR whitelist is generated using the set of event listeners detected by the browser extension 214 when the browser 212 loads a clean version of a web page 204. The XHR whitelist includes a set of one or more server addresses associated with the event listener/s detected in the clean version of the web page 204.

In some embodiments, the browser 212 does not have any additional browser extensions 214 installed or otherwise loaded when the clean version of the web page 204 is loaded. In this case, the event listeners detected by the browser extension 214 after loading the clean version of the web page 204 will not be affected by resources loaded due to factors outside of the web page 204, including resources that may be compromised but that are not loaded due to the web page 204.

Figure 3:
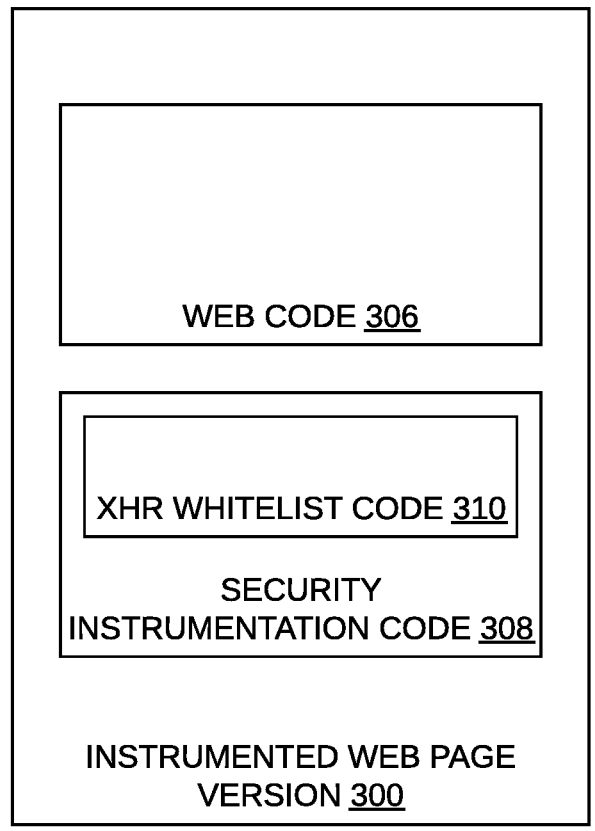
FIG. 3 illustrates an instrumented web page version at a client computing device comprising XMLHttpRequest (XHR) whitelist code in an example embodiment.

FIG. 3 illustrates an instrumented web page version at a client computing device comprising XMLHttpRequest (XHR) whitelist code in an example embodiment. For explanatory purposes, the instrumented web page version 300 is described herein with respect to the security server system 218, client computing device 232 and web server system 202 of FIG. 2 without requiring these components to operate.

The compromise detection system 208 generates an XHR whitelist for the web page 204 from baseline data for the web page 204. The baseline data is generated by the browser extension 214 and describes the event listeners added when a clean version of the web page 204 is loaded in the browser 212 of the compromise detection system 208. The XHR whitelist code 310 in the instrumented web page version 300 is generated based on the XHR whitelist generated for the web page 204.

The XHR whitelist code 310 prevents XHR requests to server addresses not included in the XHR whitelist generated for the web page 204. The instrumented web page version 300 includes the XHR whitelist code 310. The instrumented web page version 300 also includes web code 306, which corresponds to the web code 206 of the web page 204 hosted on the web server system 202. When the browser 204 loads the instrumented web page version 300, the browser 234 executes both the web code 306 and the XHR whitelist code 310. Execution of the XHR whitelist code prevents, in the browser 234 at the client computing device 232 during runtime, XHR requests to server addresses not included in the XHR whitelist for the web page 204.

In some embodiments, the XHR whitelist code 310 is provided by the security server system 218. For example, the security server system 218 may provide XHR whitelist code 310 for execution on the client computing device 232 by causing insertion of the XHR whitelist code 310 into the instrumented web page version 300. After the client computing device 232 requests the web page 204 hosted on the web server system 202, the client computing device 232 may receive the instrumented web page version 300.

In some embodiments, the security server system 218 causes insertion of the XHR whitelist code 310 into an instrumented web page version 300 such that a browser 234 executing on the client computing device 232 executes the XHR whitelist code 310 when loading the instrumented web page version 300. For example, the security server system 218 may include a code instrumentation module 216 that handles providing the XHR whitelist code 310. The code instrumentation module 216 may be implemented in the compromise detection system 208 and/or another system of the security server system 218. In some embodiments, the security server system 218 also causes insertion of other security code into the instrumented web page version 300, such as to monitor, detect, or implement one or more other security countermeasures.

In some embodiments, the security server system 218 is arranged in an in-line security server configuration with respect to the web server system 202. In an in-line security server configuration, requests from the client computing device 232 are received by the security server system 218 and analyzed before valid requests are forwarded to the web server system 202, and responses from the web server system 202 to the client computing device 232 are forwarded to the client computing device 232 through the security server system 218. In an in-line security server configuration, the security server system 218 may add the XHR whitelist code 310 and/or other security instrumentation code 308 to the instrumented web page version 300 when the web server system 202 provides the web page 204 to the client computing device 232 in response to a request for the web page 204 hosted on the web server 202.

In some embodiments, the security server system 218 is arranged in an out-of-band security server configuration with respect to the web server system 202. In an out-of-band security server configuration, requests from the client computing device 232 are transmitted directly to the web server system 202, and responses from the web server system 202 are transmitted directly to the client computing device 232. The web server system 202 may communicate with the security server system 218 over the network 250 to perform one or more security functions. For example, the security server system 218 may provide the XHR whitelist code 310 or other security instrumentation code 308 to the web server system 202 so that the web server system 202 can instrument the web page 204 with the security instrumentation code 308 before responding to the request for the web page 204 from the client computing device 232.

In some embodiments, the XHR whitelist code 310 that is added to the instrumented web page version 300 comprises instructions that, when executed in the browser 234, obtain additional XHR whitelist code and/or XHR whitelist parameters from a server, such as from another server system of the security server system 218.

Example Processes

Figure 4:
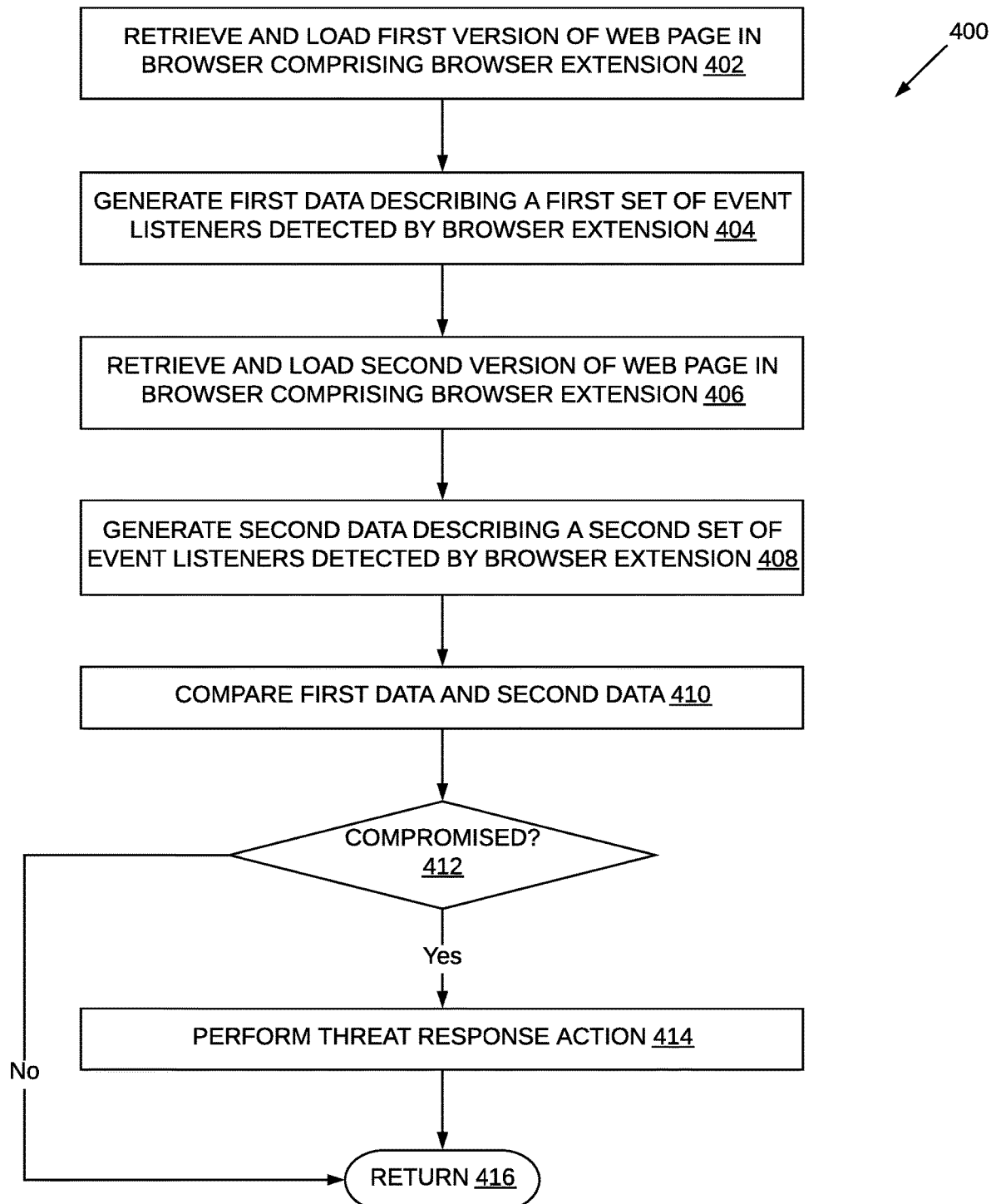
FIG. 4 is a flow diagram of a process for detecting compromised web pages in a runtime environment in an example embodiment.

FIG. 4 is a flow diagram of a process for detecting compromised web pages in a runtime environment in an example embodiment. Process 400 may be performed by one or more computing devices and/or processes thereof. For example, one or more blocks of process 400 may be performed by computer system 600. In one embodiment, one or more blocks of process 400 are performed by a compromise detection system, such as but not limited to compromise detection system 108 and compromise detection system 208. Process 400 will be described with respect to compromise detection system 108, but is not limited to performance by compromise detection system 108.

At block 402, the compromise detection system 108 retrieves and loads a first version of a web page 104 in a browser 112. For example, the compromise detection system 108 may cause a browser 112 to request the web page 104 from a web server system 102 that hosts the web page 104, receive the first version of the web page in response to the request, and load the first version of the web page in the browser 112. The browser 112 has a browser extension 114 configured to detect event listeners added when a web page is loaded by the browser 112.

At block 404, the compromise detection system 108 generates first data describing a first set of event listeners detected by the browser extension 114 when the first version of the web page 104 is loaded by the browser 112. The first version of the web page 104 may include web code, such as JavaScript instructions that, when executed, add one or more event listeners to one or more elements of a DOM tree generated when the first version of the web page 104 is loaded by the browser 112. In some embodiments, the browser extension 114 detects the first set of handlers by traversing the DOM tree for the first version of the web page 104.

At block 406, at a second time after the first time, the compromise detection system 108 retrieves and loads a second version of the web page 104 in the browser 112. For example, at the second time, the compromise detection system 108 may cause the browser 112 to request the web page 104 from the web server system 102, receive the second version of the web page 104 in response to the request, and load the second version of the web page 104 in the browser 112.

At block 408, the compromise detection system 108 generates second data describing a second set of event listeners detected by the browser extension 114 when the second version of the web page 104 is loaded by the browser 112. The second version of the web page 104 may include web code, such as JavaScript instructions that, when executed, add one or more event listeners to one or more elements of a DOM tree generated when the second version of the web page 104 is loaded by the browser 112. In some embodiments, the browser extension 114 detects the second set of handlers by traversing the DOM tree for the second version of the web page 104.

At block 410, the compromise detection system 108 compares the first data and the second data. By comparing the first data and the second data, the compromise detection system 108 can detect changes in the event listeners added in the runtime environment 120 between the first time and the second time.

At decision block 412, based on comparing the first data and the second data, the compromise detection system 108 determines whether the web page 104 is compromised. In some embodiments, the compromise detection system 108 determines whether loading the second version of the web page 114 causes malicious web code to be loaded in a runtime environment 120 of the browser 112. When the compromise detection system 108 determines that the web page 104 is compromised, processing continues to block 414. Otherwise, processing continues to block 416.

At block 414, in response to determining that the web page 104 is compromised, the compromise detection system 108 performs a threat response action. For example, the threat response action may include notifying the web server system 102 that the web page 104 is compromised. In some embodiments, the threat response action may include blocking requests for the web page 104 from one or more client computing devices and/or preventing the client computing device/s from receiving the web page 104.

At block 416, process 400 returns and/or terminates. For example, process 400 may pass control to a calling process, generate any appropriate record or notification, return after a method or function invocation, process another web page monitored by the compromise detection system 108, process the same web page 104 at a later time to monitor the web page 104, or terminate.

Figure 5:
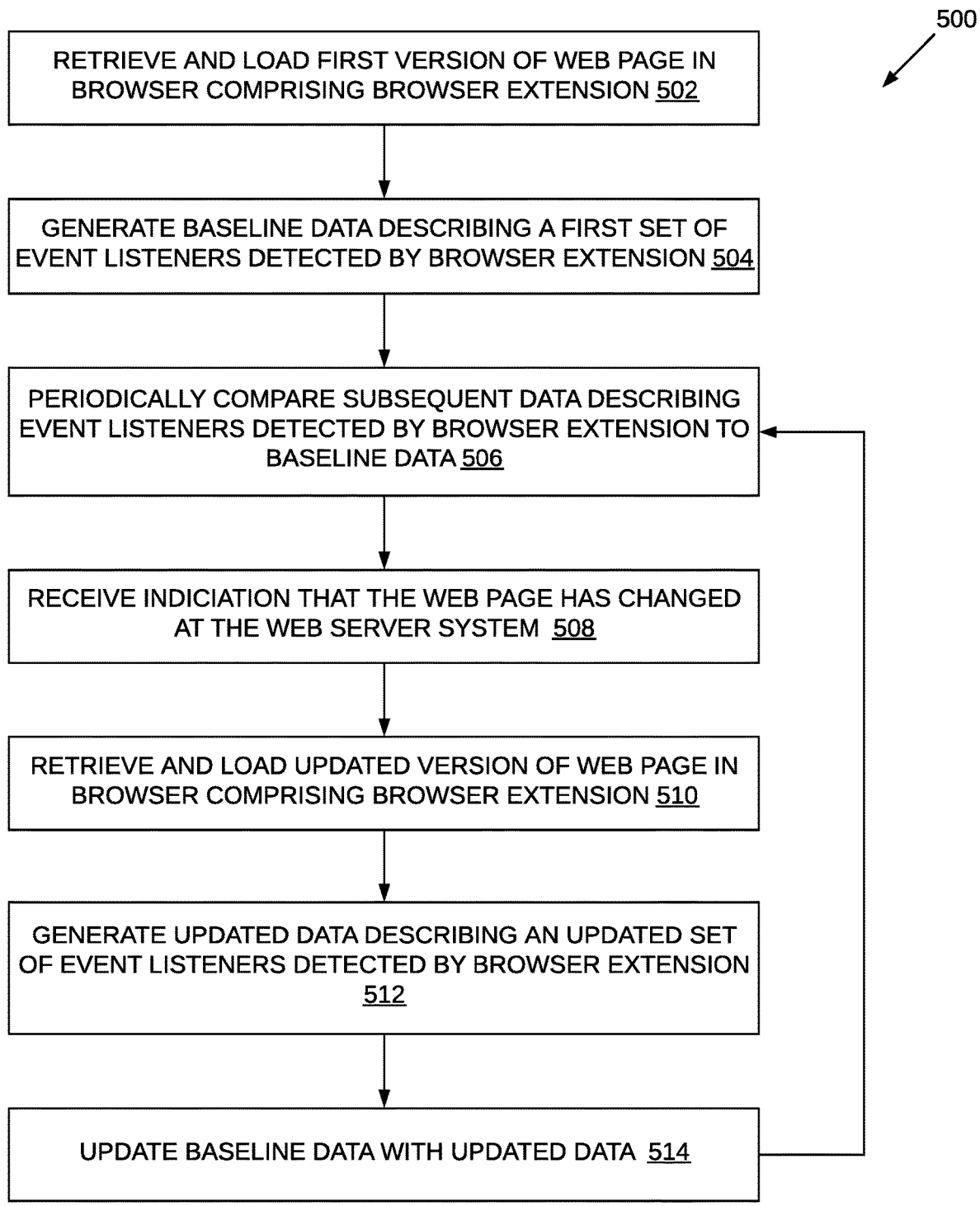
FIG. 5 is a flow diagram of a process for detecting compromised web pages in a runtime environment for an updated web page in an example embodiment.

FIG. 5 is a flow diagram of a process for detecting compromised web pages in a runtime environment for an updated web page in an example embodiment. Process 500 may be performed by one or more computing devices and/or processes thereof. For example, one or more blocks of process 500 may be performed by a computer system such as but not limited to computer system 600. In one embodiment, one or more blocks of process 500 are performed by a compromise detection system, such as but not limited to compromise detection system 108 and compromise detection system 208. Process 500 will be described with respect to compromise detection system 108, but is not limited to performance by compromise detection system 108.

At block 502, the compromise detection system 108 retrieves and loads a first version of a web page 104 in a browser 112. For example, the compromise detection system 108 may cause a browser 112 to request the web page 104 from a web server system 102 that hosts the web page 104, receive the first version of the web page 104 in response to the request, and load the first version of the web page 104 in the browser 112. The browser 112 has a browser extension 114 configured to detect event listeners added when a web page is loaded by the browser 112.

At block 504, the compromise detection system 108 generates baseline data describing a first set of event listeners detected by the browser extension 114 when the first version of the web page 104 is loaded by the browser 112. The baseline data reflects the event listeners added when a clean version of the web page 104 is loaded in the browser 112.

At block 506, the compromise detection system 108 periodically compares subsequent data describing event listeners detected by the browser extension 114 to the baseline data. The subsequent data describes event listeners added when subsequent versions of the web page 104 are loaded in the browser 112 with the browser extension 114 at later points in time. For example, subsequent versions of the web page 104 may be periodically retrieved and loaded in the browser 112 with the browser extension 114 to provide runtime environment monitoring of the web page 104. By periodically comparing the subsequent data with the baseline data, changes in the event listeners added in the runtime environment can be detected.

At block 508, the compromise detection system 108 receives an indication that the web page 104 has changed at the web server system 102. For example, a new version of the web page 104 may be published and available from the web server system 102. In some embodiments, the indication is in version information included with the web page 104. Alternatively and/or in addition, the compromise detection system 108 may receive a notification from the web server system 102 when a new version of the web page 104 is published or otherwise made available over the Internet.

At block 510, the compromise detection system 108 retrieves and loads an updated version of the web page 104 in the browser 112 with the web extension 114. The updated version of the web page 104 reflects legitimate changes to the web page 104 at the web server system 102.

At block 512, the compromise detection system 108 generates updated data describing an updated set of event listeners detected by the browser extension 114 when the updated web page 104 is loaded by the browser 112. The updated data reflects the event listeners added when a clean version of the updated web page 104 is loaded in the browser 112.

At block 514, the compromise detection system 108 updates the baseline data with the updated data. Processing continues to block 508, where the compromise detection system 108 periodically compares subsequent data to the updated baseline data, thereby continuing to monitor the web page 104.

Implementation Mechanisms—Hardware Overview

According to one embodiment, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 6:
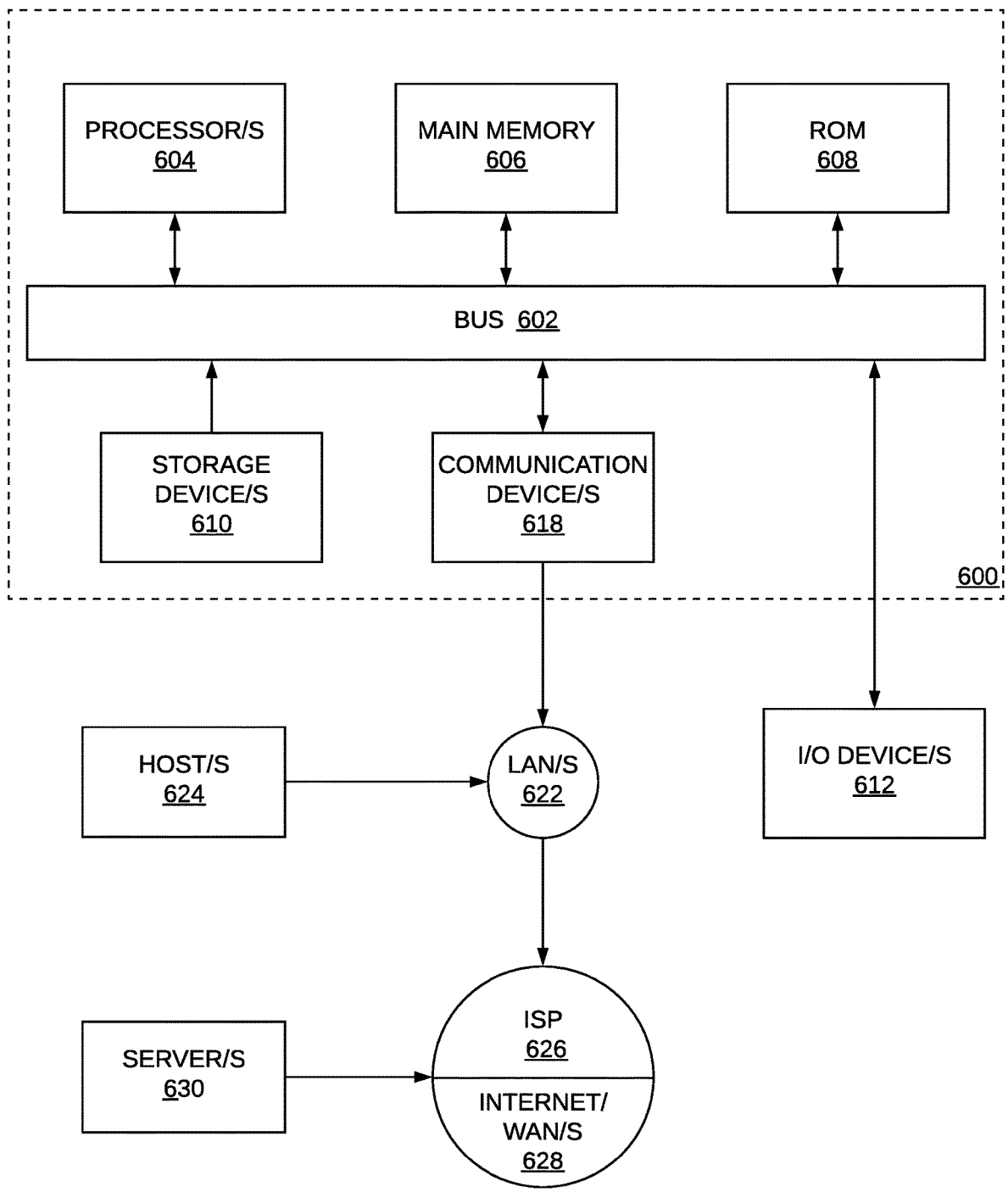
FIG. 6 illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and one or more hardware processors 604 coupled with bus 602 for processing information, such as basic computer instructions and data. Hardware processor/s 604 may include, for example, one or more general-purpose microprocessors, graphical processing units (GPUs), coprocessors, central processing units (CPUs), and/or other hardware processing units.

Computer system 600 also includes one or more units of main memory 606 coupled to bus 602, such as random access memory (RAM) or other dynamic storage, for storing information and instructions to be executed by processor/s 604. Main memory 606 may also be used for storing temporary variables or other intermediate information during execution of instructions to be executed by processor/s 604. Such instructions, when stored in non-transitory storage media accessible to processor/s 604, turn computer system 600 into a special-purpose machine that is customized to perform the operations specified in the instructions. In some embodiments, main memory 606 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 600 may further include one or more units of read-only memory (ROM) 608 or other static storage coupled to bus 602 for storing information and instructions for processor/s 604 that are either always static or static in normal operation but reprogrammable. For example, ROM 608 may store firmware for computer system 600. ROM 608 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 610, such as a magnetic disk or optical disk, is provided and coupled to bus 602 for storing information and/or instructions. Storage device/s 610 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 600 may be coupled via bus 602 to one or more input/output (I/O) devices 612. For example, I/O device/s 612 may include one or more displays for displaying information to a computer user, such as a cathode ray tube (CRT) display, a Liquid Crystal Display (LCD) display, a Light-Emitting Diode (LED) display, a projector, and/or any other type of display.

I/O device/s 612 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 604 and for controlling cursor movement on another I/O device (e.g. a display). This input device typically has at degrees of freedom in two or more axes, (e.g. a first axis x, a second axis y, and optionally one or more additional axes z . . . ), that allows the device to specify positions in a plane. In some embodiments, the one or more I/O device/s 612 may include a device with combined I/O functionality, such as a touch-enabled display.

Other I/O device/s 612 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor/s 604 over bus 602.

Computer system 600 may implement the techniques described herein using customized hard-wired logic, one or more ASICs or FPGAs, firmware or program logic which, in combination with the computer system causes or programs, causes computer system 600 to be a special-purpose machine. According to one embodiment, the techniques herein are performed by computer system 600 in response to processor/s 604 executing one or more sequences of one or more instructions contained in main memory 606. Such instructions may be read into main memory 606 from another storage medium, such as one or more storage device/s 610. Execution of the sequences of instructions contained in main memory 606 causes processor/s 604 to perform the process steps described herein. In alternative embodiments, hard-wired circuitry may be used in place of or in combination with software instructions.

Computer system 600 also includes one or more communication interfaces 618 coupled to bus 602. Communication interface/s 618 provide two-way data communication over one or more physical or wireless network links 620 that are connected to a local network 622 and/or a wide area network (WAN), such as the Internet. For example, communication interface/s 618 may include an integrated services digital network (ISDN) card, cable modem, satellite modem, or a modem to provide a data communication connection to a corresponding type of telephone line. Alternatively and/or in addition, communication interface/s 618 may include one or more of: a local area network (LAN) device that provides a data communication connection to a compatible local network 622; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 628); and other networking devices that establish a communication channel between computer system 600 and one or more LANs 622 and/or WANs.

Network link/s 620 typically provides data communication through one or more networks to other data devices. For example, network link/s 620 may provide a connection through one or more local area networks 622 (LANs) to one or more host computers 624 or to data equipment operated by an Internet Service Provider (ISP) 626. ISP 626 in turn provides connectivity to one or more wide area networks 628, such as the Internet. LAN/s 622 and WAN/s 628 both use electrical, electromagnetic or optical signals that carry digital data streams. The signals through the various networks and the signals on network link/s 620 and through communication interface/s 618 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its main memory 606 and send the instructions over a telecommunications line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 can send messages and receive data, including program code, through the network(s), network link 620 and communication interface 618. In the Internet example, one or more servers 630 might transmit signals corresponding to data or instructions requested for an application program executed by the computer system 600 through the Internet 628, ISP 626, local network 622 and a communication interface 618. The received signals may include instructions and/or information for execution and/or processing by processor/s 604. Processor/s 604 may execute and/or process the instructions and/or information upon receiving the signals by accessing main memory 606, or at a later time by storing them and then accessing them from storage device/s 610.

Other Aspects of Disclosure

Using the networked computer arrangements, intermediary computer, or processing methods described herein, security in client-server data processing may be significantly increased. Polymorphic and/or other techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities, are frustrated because object identifiers or polymorphic hooks may change over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium having stored thereon instructions for managing servers comprising executable code which when executed by processors, causes the processors to:
   at a first time, retrieve and load a first version of a web page hosted on a web server system in a browser comprising a browser extension configured to detect event listeners added when web pages are loaded by the browser;
   generate first data describing a first set of event listeners detected by the browser extension when the first version of the web page is loaded;
   at a second time after the first time, retrieve and load a second version of the web page in the browser;
   generate second data describing a second set of event listeners detected by the browser extension when the second version of the web page is loaded;
   determine that the web page is compromised by comparing the first data and the second data to identify a change between the first set of event listeners and the second set of event listeners, wherein the change is added at run time between the first time and the second time, prior to loading the second version of the web page; and
   in response to determining that the web page is compromised, perform a threat response action.

2. The medium of claim 1, wherein the executable code which when executed by the processors, further causes the processors to:
   at a third time, retrieve and load a first version of a second web page hosted on a second web server system in the browser;
   generate third data describing a third set of event listeners detected by the browser extension when the first version of the second web page is loaded;
   at a fourth time after the third time, retrieve and load a second version of the second web page in the browser;
   generate fourth data describing a fourth set of event listeners detected by the browser extension when the second version of the second web page is loaded;
   determine that the second web page is compromised based on comparing the third data and the fourth data; and
   in response to determining that the second web page is compromised, perform a second threat response action.

3. The medium of claim 1:
   wherein computing devices belong to a security server system configured to detect, in a plurality of web pages hosted by a plurality of web server systems, compromised web pages;
   wherein the plurality of web pages includes the web page; and
   wherein the plurality of web server systems includes the web server system.

4. The medium of claim 1:
wherein the first version of the web page includes first web code that adds the first set of event listeners to one or more elements of a first Document Object Model (DOM) tree generated by the browser when the first version of the web page is loaded; and
wherein the second version of the web page includes second web code that adds the second set of event listeners to one or more elements of a second DOM tree generated by the browser when the second version of the web page is loaded.

5. The medium of claim 1, wherein the executable code which when executed by the processors, further causes the processors to:
based on the first data, generate an XHR whitelist comprising server addresses associated with the first set of event listeners; and
provide XHR whitelist code for execution on a client computing device that requests the web page after the first time, wherein the XHR whitelist code prevents XHR requests to server addresses not included in the XHR whitelist.

6. A method implemented by one or more computer systems, server devices, or client devices, the method comprising:
at a first time, retrieving and loading a first version of a web page hosted on a web server system in a browser comprising a browser extension configured to detect event listeners added when web pages are loaded by the browser;
generating first data describing a first set of event listeners detected by the browser extension when the first version of the web page is loaded;
at a second time after the first time, retrieving and loading a second version of the web page in the browser;
generating second data describing a second set of event listeners detected by the browser extension when the second version of the web page is loaded;
determining that the web page is compromised by comparing the first data and the second data to identify a change between the first set of event listeners and the second set of event listeners, wherein the change is added at run time between the first time and the second time, prior to loading the second version of the web page; and
in response to determining that the web page is compromised, performing a threat response action.

7. The method of claim 6, further comprising:
at a third time, retrieving and loading a first version of a second web page hosted on a second web server system in the browser;
generating third data describing a third set of event listeners detected by the browser extension when the first version of the second web page is loaded; at a fourth time after the third time, retrieving and loading a second version of the second web page in the browser;
generating fourth data describing a fourth set of event listeners detected by the browser extension when the second version of the second web page is loaded;
determining that the second web page is compromised based on comparing the third data and the fourth data; and
in response to determining that the second web page is compromised, performing a second threat response action.

8. The method of claim 6:
wherein the one or more computing devices performing the method belong to a security server system configured to detect, in a plurality of web pages hosted by a plurality of web server systems, compromised web pages;
wherein the plurality of web pages includes the web page; and
wherein the plurality of web server systems includes the web server system.

9. The method of claim 6:
wherein the first version of the web page includes first web code that adds the first set of event listeners to one or more elements of a first Document Object Model (DOM) tree generated by the browser when the first version of the web page is loaded; and
wherein the second version of the web page includes second web code that adds the second set of event listeners to one or more elements of a second DOM tree generated by the browser when the second version of the web page is loaded.

10. The method of claim 6, further comprising:
based on the first data, generating an XHR whitelist comprising server addresses associated with the first set of event listeners; and
providing XHR whitelist code for execution on a client computing device that requests the web page after the first time, wherein the XHR whitelist code prevents XHR requests to server addresses not included in the XHR whitelist.

11. An apparatus, comprising memory comprising programmed instructions stored in the memory and processors configured to be capable of executing the programmed instructions stored in the memory to:
at a first time, retrieve and load a first version of a web page hosted on a web server system in a browser comprising a browser extension configured to detect event listeners added when web pages are loaded by the browser;
generate first data describing a first set of event listeners detected by the browser extension when the first version of the web page is loaded;
at a second time after the first time, retrieve and load a second version of the web page in the browser;
generate second data describing a second set of event listeners detected by the browser extension when the second version of the web page is loaded;
determine that the web page is compromised by comparing the first data and the second data to identify a change between the first set of event listeners and the second set of event listeners, wherein the change is added at run time between the first time and the second time, prior to loading the second version of the web page; and
in response to determining that the web page is compromised, perform a threat response action.

12. The device as set forth in claim 11, wherein the processors are further configured to be capable of executing the programmed instructions stored in the memory to:
at a third time, retrieve and load a first version of a second web page hosted on a second web server system in the browser;
generate third data describing a third set of event listeners detected by the browser extension when the first version of the second web page is loaded; at a fourth time after the third time, retrieve and load a second version of the second web page in the browser;

generate fourth data describing a fourth set of event listeners detected by the browser extension when the second version of the second web page is loaded;

determine that the second web page is compromised based on comparing the third data and the fourth data; and in response to determining that the second web page is compromised, perform a second threat response action.

13. The device as set forth in claim 11:

wherein computing devices belong to a security server system configured to detect, in a plurality of web pages hosted by a plurality of web server systems, compromised web pages;

wherein the plurality of web pages includes the web page; and wherein the plurality of web server systems includes the web server system.

14. The device as set forth in claim 11:

wherein the first version of the web page includes first web code that adds the first set of event listeners to one or more elements of a first Document Object Model (DOM) tree generated by the browser when the first version of the web page is loaded; and wherein the second version of the web page includes second web code that adds the second set of event listeners to one or more elements of a second DOM tree generated by the browser when the second version of the web page is loaded.

15. The device as set forth in claim 11, wherein the processors are further configured to be capable of executing the programmed instructions stored in the memory to:

based on the first data, generate an XHR whitelist comprising server addresses associated with the first set of event listeners; and provide XHR whitelist code for execution on a client computing device that requests the web page after the first time, wherein the XHR whitelist code prevents XHR requests to server addresses not included in the XHR whitelist.

16. A system, comprising traffic management apparatuses, client devices, or server devices, the system comprising memory comprising programmed instructions stored thereon and processors configured to be capable of executing the stored programmed instructions to:

at a first time, retrieve and load a first version of a web page hosted on a web server system in a browser comprising a browser extension configured to detect event listeners added when web pages are loaded by the browser;

generate first data describing a first set of event listeners detected by the browser extension when the first version of the web page is loaded;

at a second time after the first time, retrieve and load a second version of the web page in the browser;

generate second data describing a second set of event listeners detected by the browser extension when the second version of the web page is loaded;

determine that the web page is compromised by comparing the first data and the second data to identify a change between the first set of event listeners and the second set of event listeners, wherein the change is added at run time between the first time and the second time, prior to loading the second version of the web page; and in response to determining that the web page is compromised, perform a threat response action.

17. The system as set forth in claim 16, wherein the processors are further configured to be capable of executing the programmed instructions stored in the memory to:

at a third time, retrieve and load a first version of a second web page hosted on a second web server system in the browser;

generate third data describing a third set of event listeners detected by the browser extension when the first version of the second web page is loaded; at a fourth time after the third time, retrieve and load a second version of the second web page in the browser;

generate fourth data describing a fourth set of event listeners detected by the browser extension when the second version of the second web page is loaded;

determine that the second web page is compromised based on comparing the third data and the fourth data; and in response to determining that the second web page is compromised, perform a second threat response action.

18. The system as set forth in claim 16:

wherein computing devices belong to a security server system configured to detect, in a plurality of web pages hosted by a plurality of web server systems, compromised web pages;

wherein the plurality of web pages includes the web page; and wherein the plurality of web server systems includes the web server system.

19. The system as set forth in claim 16:

wherein the first version of the web page includes first web code that adds the first set of event listeners to one or more elements of a first Document Object Model (DOM) tree generated by the browser when the first version of the web page is loaded; and wherein the second version of the web page includes second web code that adds the second set of event listeners to one or more elements of a second DOM tree generated by the browser when the second version of the web page is loaded.

20. The system as set forth in claim 16, wherein the processors are further configured to be capable of executing the programmed instructions stored in the memory to:

based on the first data, generate an XHR whitelist comprising server addresses associated with the first set of event listeners; and provide XHR whitelist code for execution on a client computing device that requests the web page after the first time, wherein the XHR whitelist code prevents XHR requests to server addresses not included in the XHR whitelist.

* * * * *